April 13, 1965  P. C. READ  3,178,005
DISCHARGING MECHANISM FOR BOTTLE HANDLING MACHINES
Filed Jan. 25, 1963  10 Sheets-Sheet 1

April 13, 1965 P. C. READ 3,178,005
DISCHARGING MECHANISM FOR BOTTLE HANDLING MACHINES
Filed Jan. 25, 1963 10 Sheets-Sheet 4

Inventor
Philip C. Read

April 13, 1965   P. C. READ   3,178,005
DISCHARGING MECHANISM FOR BOTTLE HANDLING MACHINES
Filed Jan. 25, 1963   10 Sheets-Sheet 6

INVENTOR.
Philip C. Read
By Ira Milton Jones
Attorney

April 13, 1965 P. C. READ 3,178,005
DISCHARGING MECHANISM FOR BOTTLE HANDLING MACHINES
Filed Jan. 25, 1963 10 Sheets-Sheet 7

Inventor
Philip C. Read
By Ira Milton Jones
Attorney

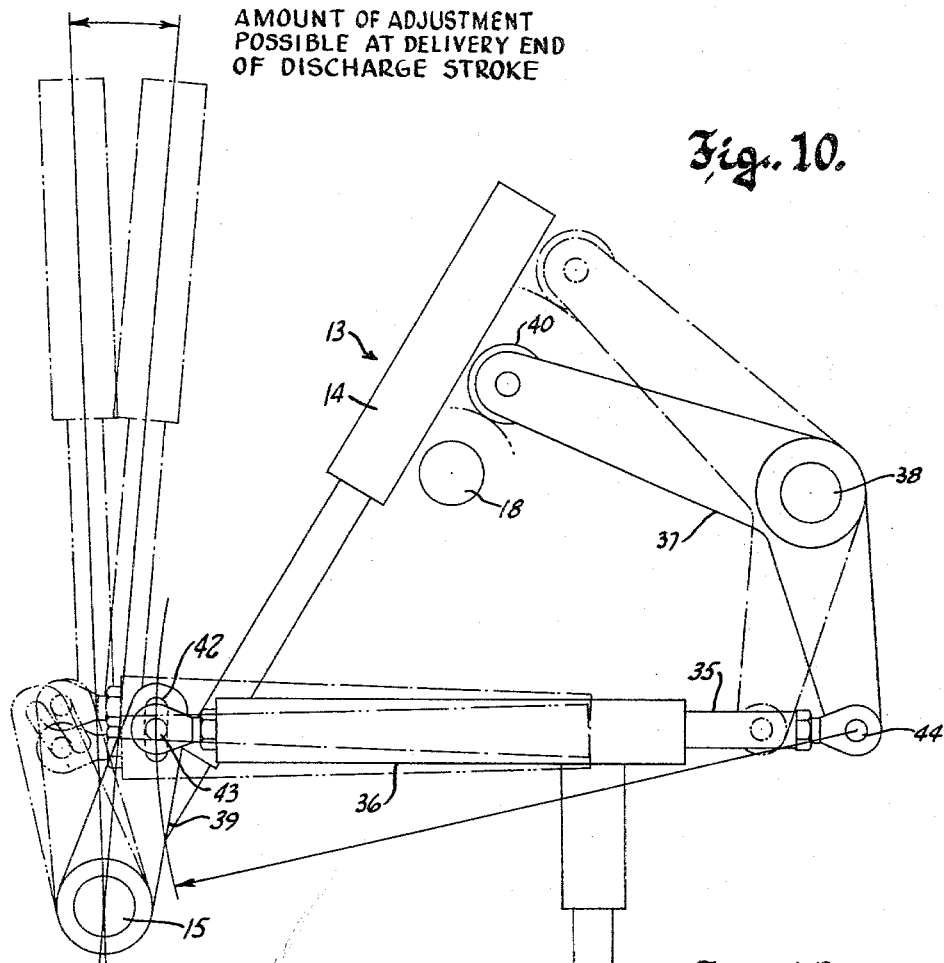
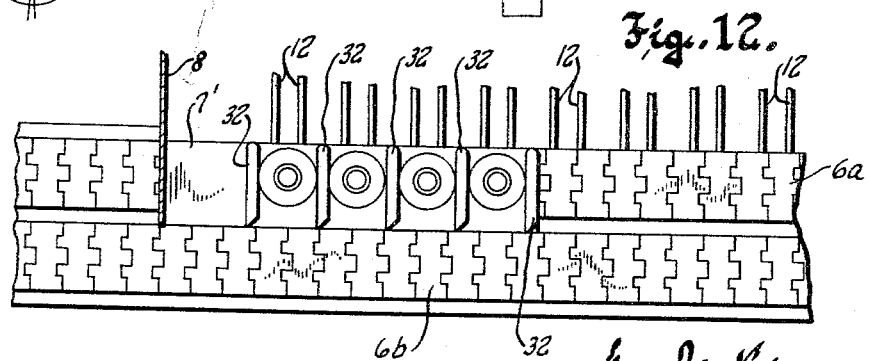

April 13, 1965   P. C. READ   3,178,005
DISCHARGING MECHANISM FOR BOTTLE HANDLING MACHINES
Filed Jan. 25, 1963   10 Sheets-Sheet 9
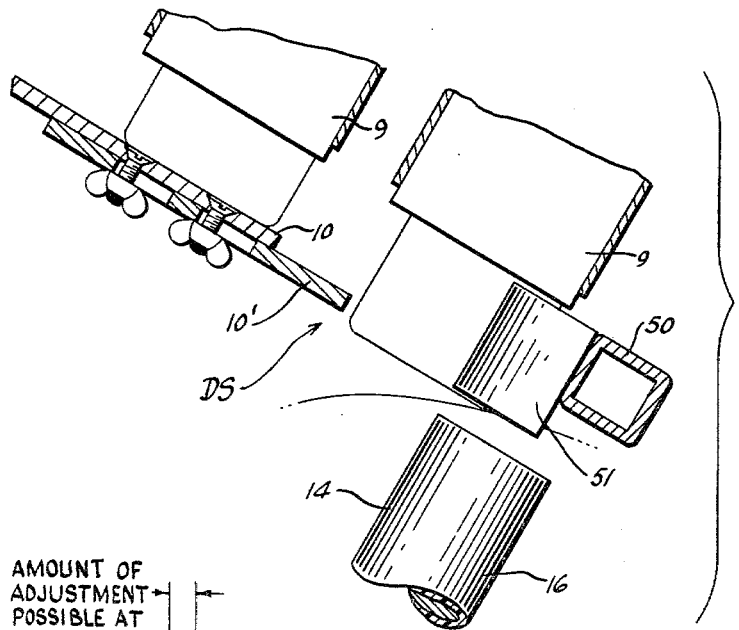
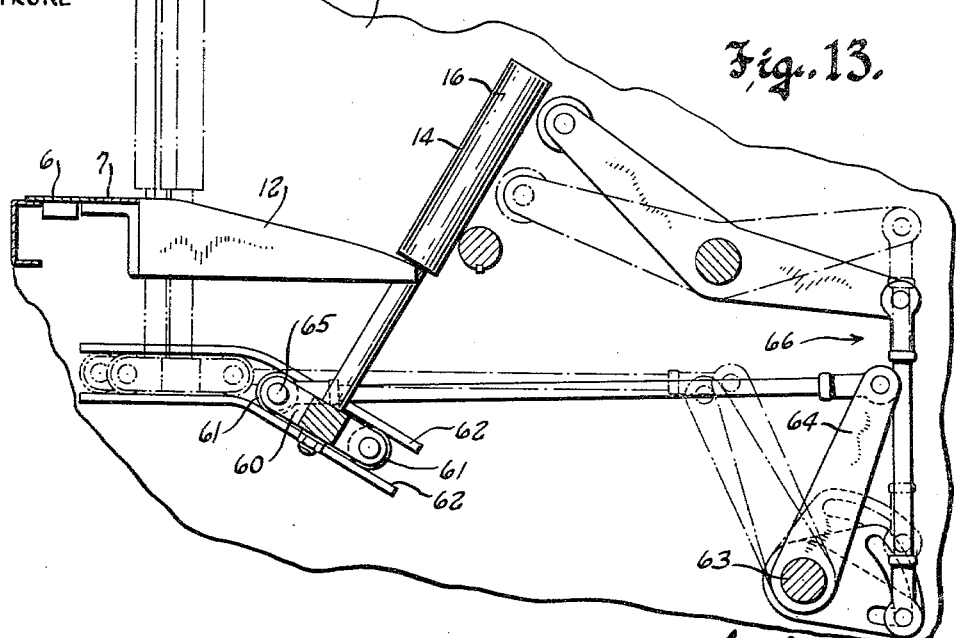
Inventor
Philip C. Read
By
Attorney

United States Patent Office 3,178,005
Patented Apr. 13, 1965

3,178,005
DISCHARGING MECHANISM FOR BOTTLE
HANDLING MACHINES
Philip C. Read, Elm Grove, Wis., assignor to Dostal &
Lowey Co., Inc., Menomonee Falls, Wis., a corporation
of Wisconsin
Filed Jan. 25, 1963, Ser. No. 253,854
10 Claims. (Cl. 198—24)

This invention relates to bottle handling machines and refers more particularly to discharging or unloading mechanisms for bottle washing machines. Accordingly, this invention would be classified with that of the Vamvakas Patent No. 2,858,929.

In bottle washing machines, an endless conveyor having transversely extending rows of open-ended pockets carries the bottles from a loading station through the various bottle treating zones of the machine, and then brings them to a discharge station. At this point, the unloading mechanism transfers the bottles from the conveyor pockets—row after row thereof—onto a delivery conveyor that carries the cleaned and sterilized bottles to filling and capping machines.

As in the Vamvakas patent, the bottle unloading mechanism of this invention utilizes rotating cams to lower the bottles from the pockets of the main conveyor onto tracks along which they are slid towards the delivery conveyor, but in this invention the rotating cams do not also propel the bottles along the tracks; other pusher means are provided for this purpose. Because of this difference, and others which wil become apparent, the unloading mechanism of this invention maintains better control over the bottles so that there is less likelihood of having bottles tip, subjects them to less scuffing and rubbing, keeps them exposed to view, and allows them to stand at rest for at least a full cycle of the machine to facilitate inspection thereof.

Moreover, the greater control which the mechanism maintains over the bottles allows the machine to be run faster than was heretofore possible.

Another advantage that flows from the differences between the unloading mechanism of this invention and those of the prior art, is adjustability of the final position of the bottles delivered by the mechanism, and the incorporation of desirable safety features.

It follows, therefore, that the purpose and object of this invention is to provide an improved, simplified, and more efficient bottle unloading apparatus for bottle washing and treating machines.

With the above and other objects in view which will apear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention and a modification of a part thereof, constructed according to the best mode so far devised for the practical application of the principles thereof and in which:

FIGURE 10 is a diagrammatic view illustrating the manner in which the final location of the delivered bottles may be adjusted;

FIGURE 11 is a fragmentary detail view illustrating a refinement of the machine;

FIGURE 12 is a top view of the receiving end portion of a two chain delivery conveyor which can be used in lieu of a single chain conveyor;

FIGURE 13 is a detail view of the bottle guiding and pushing means and illustrating an alternative way of guiding its motion with a view towards achieving better control over the bottles as they are advanced to the delivery conveyor.

Figure 1:
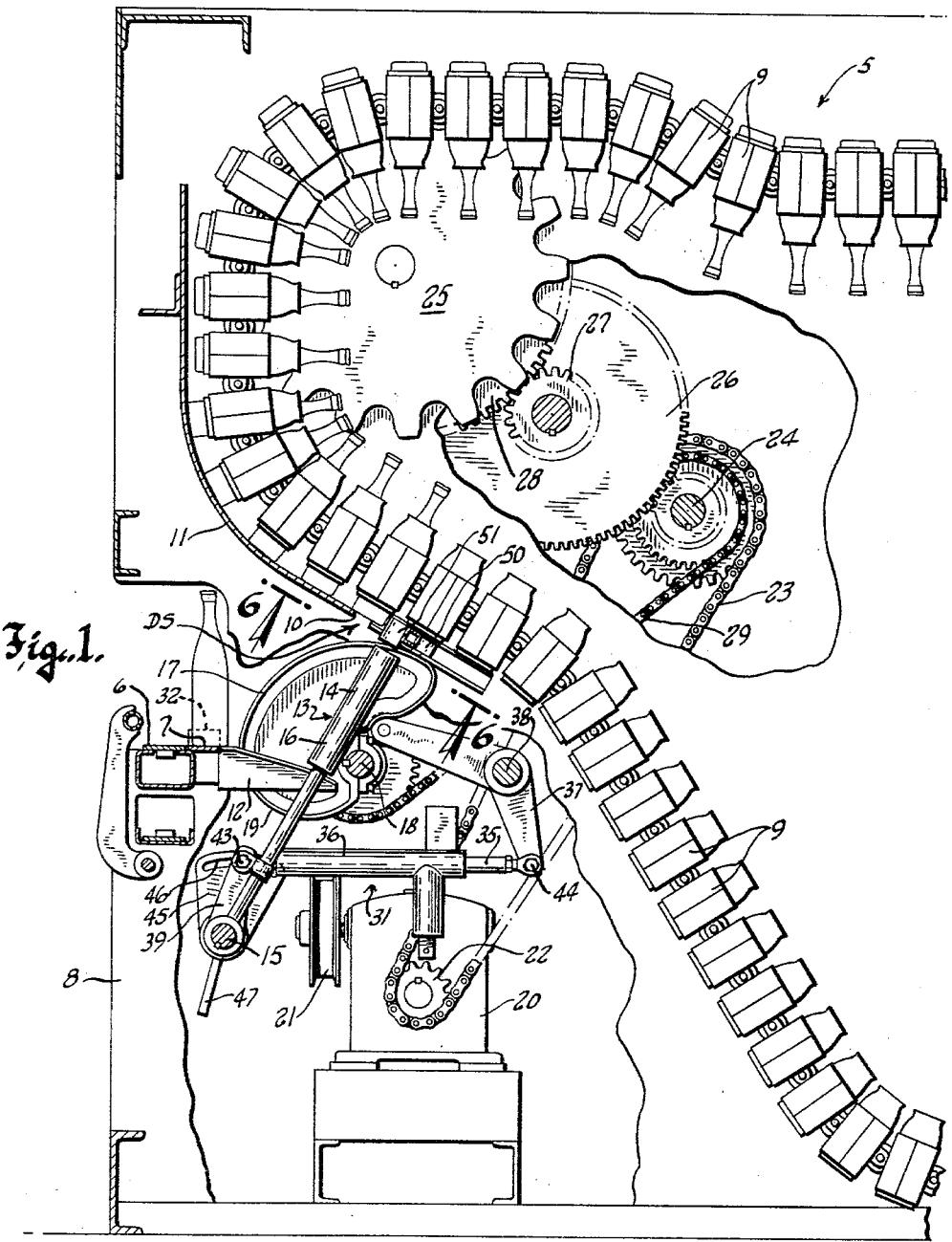
FIGURE 1 is a longitudinal sectional view through the unloading end of a bottle washing machine equipped with the bottle unloading mechanism of this invention.
Figure 2:
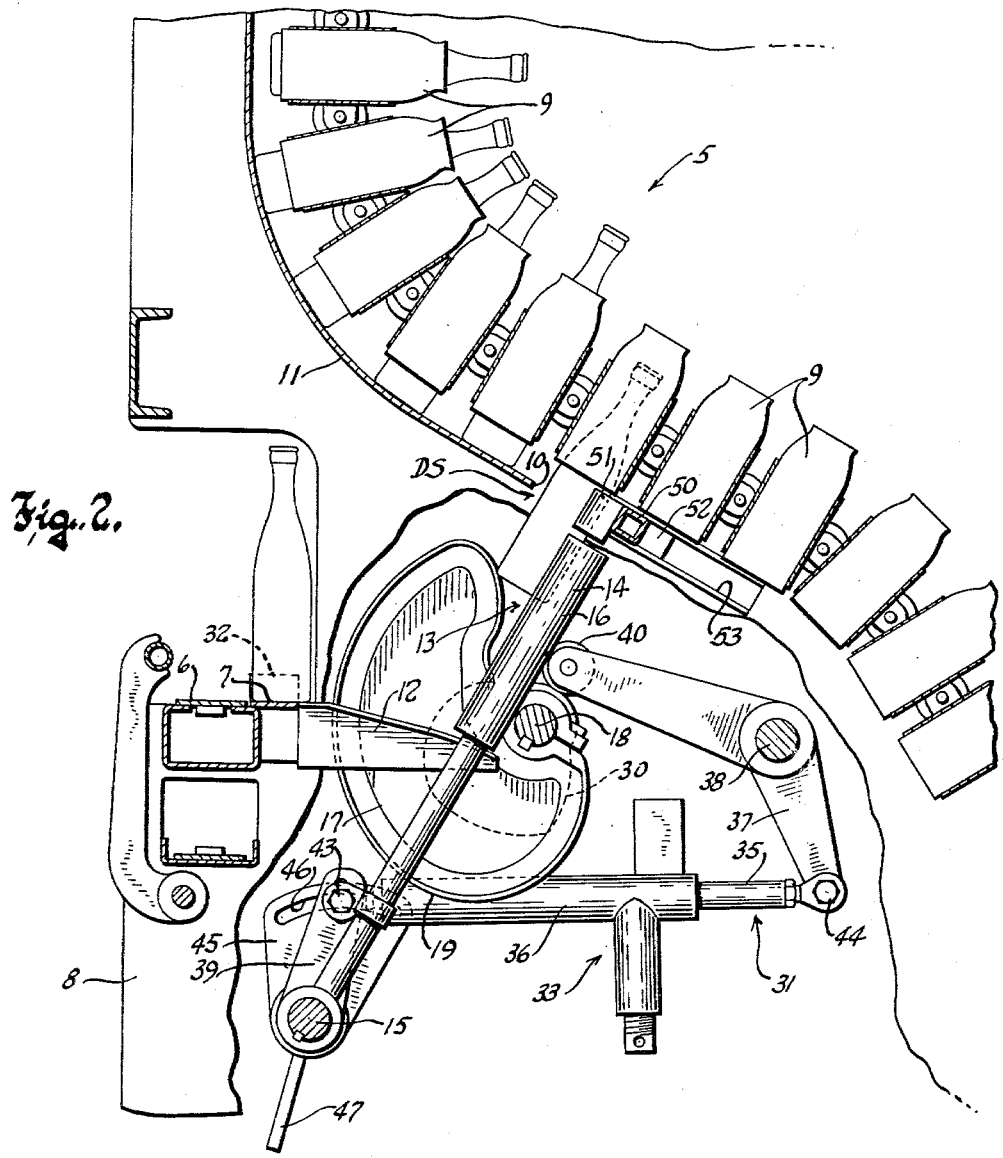
FIGURES 2, 3, 4 and 5 are views similar to FIGURE 1, but on a somewhat larger scale, and illustrating only that much of the machine associated more or less directly with the bottle unloading mechanism.
Figure 3:
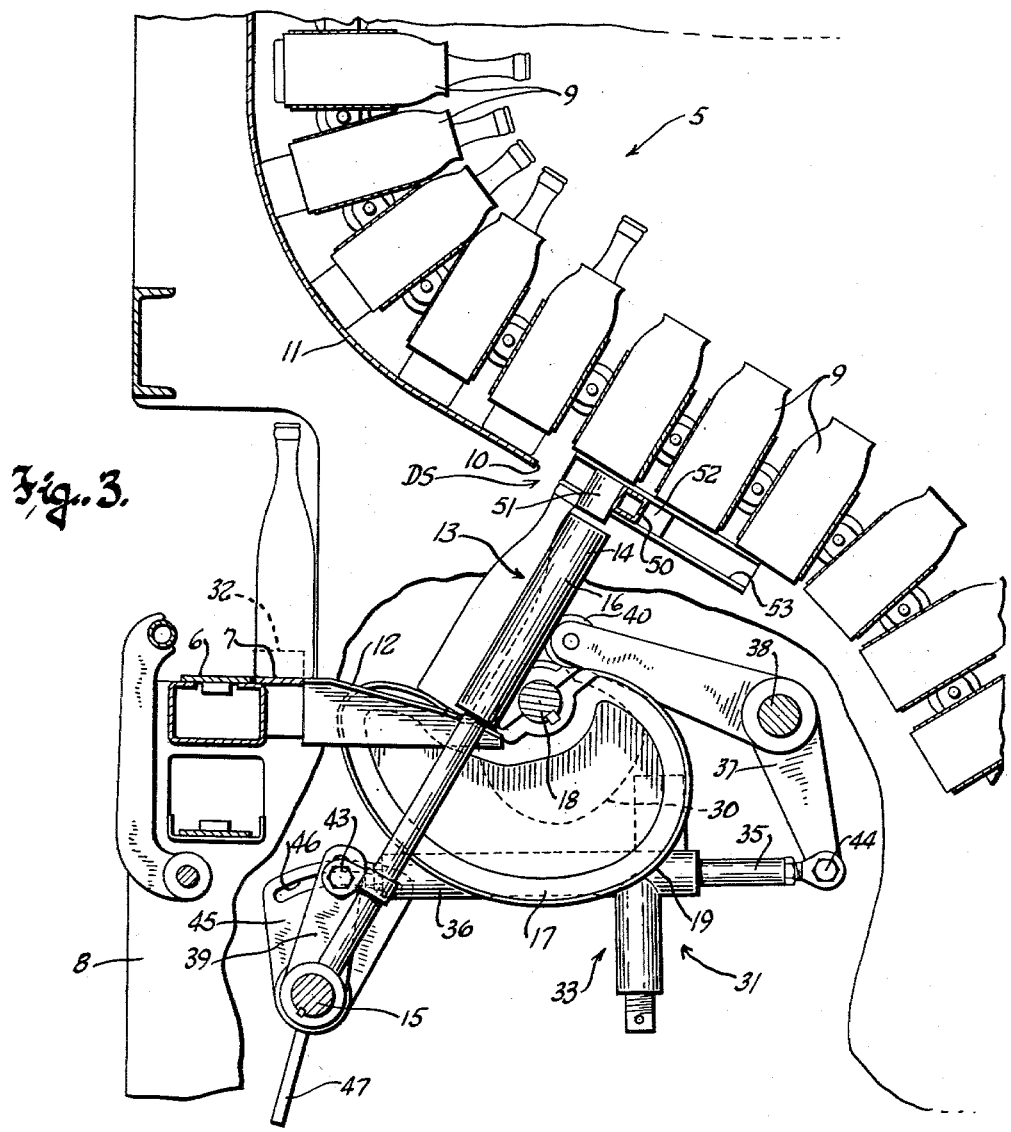

Referring now particularly to the accompanying drawings in which like numerals indicate like parts throughout the several views, the numeral 5 designates the endless conveyor of a bottle washing or handling machine by which bottles are carried through the machine and successively brought to a discharge station DS for transfer onto a delivery conveyor 6. The conveyor 6 is of the conventional type employed in bottle handling equipment and has a stretch thereof extending transversely across the unloading end of the bottle washing or handling machine. Hence, in FIGURES 1 to 5, inclusive, this conveyor is shown in cross section with its upper bottle carrying stretch contiguous to and flush with a horizontal platform or table 7 which, in this art, is open referred to as a dead plate. This platform or dead plate 7 extends transversely across the machine from one to the other of its side walls 8.

The conveyor 5 has the customary transversely extending rows of bottle-receiving cups or pockets 9 in which the bottles hang upside down as they are carried through the machine. The number of pockets or cups in each row thereof, of course, depends upon the width of the machine, but regardless of how many pockets there are in each row, all of the bottles in each row are simultaneously brought to the discharge station.

The discharge station is defined by the lower edge 10 of a curved retainer wall 11, which extends across the width of the machine and serves to hold the bottles in their respective pockets until the exact moment they are destined to leave the conveyor for transfer to the platform 7 and, from there, onto the delivery conveyor 6. The lower edge 10 of the retainer wall thus may be considered a drop-off edge.

The retainer can be one unbroken sheet or plate, mounted and curved as shown, or it can consist of a series of side-by-side tracks, each in line with one of the bottle-carrying pockets in each row thereof. In any event, the significant point is that the shape of the retainer and the adjacent path of the conveyor 5 is such that the bottles are in an inclined position as they approach the discharge station DS, and that the location of the lower edge 10 of the retainer determines the instant the bottles drop from the conveyor pockets. If desired, the location of the edge 10 can be made adjustable as shown in FIGURE 11, wherein a plate 10' is adjustably secured to the retainer and provides the actual drop-off edge.

Beneath the discharge station there is a series of side-by-side tracks or ramps 12, each having a delivery end contiguous to and flush with the dead plate 7. One such track or ramp is provided for each bottle-carrying pocket in a row thereof. The top faces of these tracks are coplanar and are flat throughout most of their length. They are also inclined to make them substantially perpendicular to the bottles at the discharge station.

A bottle guiding and pushing device, indicated generally by the numeral 13, provides chutes down which the bottles may slide in passing from the pockets of the conveyor 5 onto the tracks or ramps 12, and also pushes or slides the bottles along the tracks and onto the dead plate or platform 7. Essentially, the bottle guiding and pushing device consists of a row of parallel fingers 14, all projecting up from a rock shaft 15, the ends of which are journalled in bearings (not shown) at opposite sides of the machine. The bearings for the rock shaft are so located that the fingers 14 swing about an axis which lies below and is substantially in vertical alignment with the delivery end of the inclined tracks of ramps 12. Hence, the fingers 14 are swingable between an inclined bottle-receiving position, shown in FIGURES 1, 2, and 3, and an upright bottle-delivering position, illustrated in dotted lines in FIGURE 5.

The fingers 14 are spaced apart the same distance as the tracks or ramps 12, but are in staggered relation thereto so that all but the endmost fingers operate in the space between two adjacent tracks or ramps 12. The endmost fingers are disposed outwardly of the endmost tracks or ramps. Hence, each track or ramp lies between a pair of fingers. The upper end portions of the fingers which project above the tracks are covered with sleeves 16 of plastic, such as nylon or some other suitable material that is wear resistant and yet will not scuff nor mar the bottles. The sleeves may be cylindrical or, if desired, they may have a triangular cross-section, but in any event the lower ends thereof are contiguous to the tracks or ramps 12 and their upper ends are closely adjacent to the discharge station when the fingers are in their inclined bottle receiving positions. Also their cross-sectional shape and transverse dimension is such that pairs of adjacent sleeves coact to engage one bottle and hold it against lateral displacement, while permitting bottle lowering cams 17 to operate between adjacent fingers. To accommodate these cams, the tracks or ramps 12 are bifurcated.

All of the cams 17 are fixed to a common shaft 18, which extends transversely across the machine, and is suitably journalled in bearings (not shown) mounted at the opposite sides of the machine. The cams 17 rotate continuously when the machine is in operation, and by virtue of their shape and the timing which exists between the travel of the endless conveyor 5, the oscillation of the fingers 14, and the rotation of the cams, the high point 19 of the cams is at the discharge station DS every time a row of pockets 9 arrives thereat, and the fingers 14 are in their inclined position forming chutes down which the bottles may slide.

Since the orbit of the high points 19 of the cams is closely adjacent to the lower drop-off edge 10 of the retainer 11 (which defines the discharge station) the distance the bottles fall as they drop from the retainer into the chutes formed by the sleeves 16 on the fingers 14 and onto the cams, is very slight. The transition from the conveyor to the tranfer mechanism is thus negotiated with a minimum of danger of breakage and with utmost assurance that the bottles will retain their proper upright positions.

As the cams 17 rotate, they gently lower the bottles down the chutes formed by the fingers 14, and at about the instant they reach the tracks 12, the fingers begin to push or slide the bottles along the tracks towards the dead plate 7.

The use of rotating cams to lower the bottles from the conveyor pockets is not new with this invention, being employed for instance in the unloading mechanism of the aforesaid Vamvakas patent; but heretofore the cams did not coact with an oscillating bottle guiding and pushing device as they do in this invention; and because of this difference, the prior unloading or transfer mechanisms did not maintain as good control over the bottles as does the mechanism of this invention. Here, each bottle, standing firmly and squarely upon the flat surface of the tracks or ramps 12, is pushed toward the delivery conveyor, not by the edge of a rotating cam but by two spaced fingers that extend a distance above the track to support and cradle the entire bottle between them. This affords maximum assurance that the bottle will not tip or wobble as it moves up the track.

Figure 4:
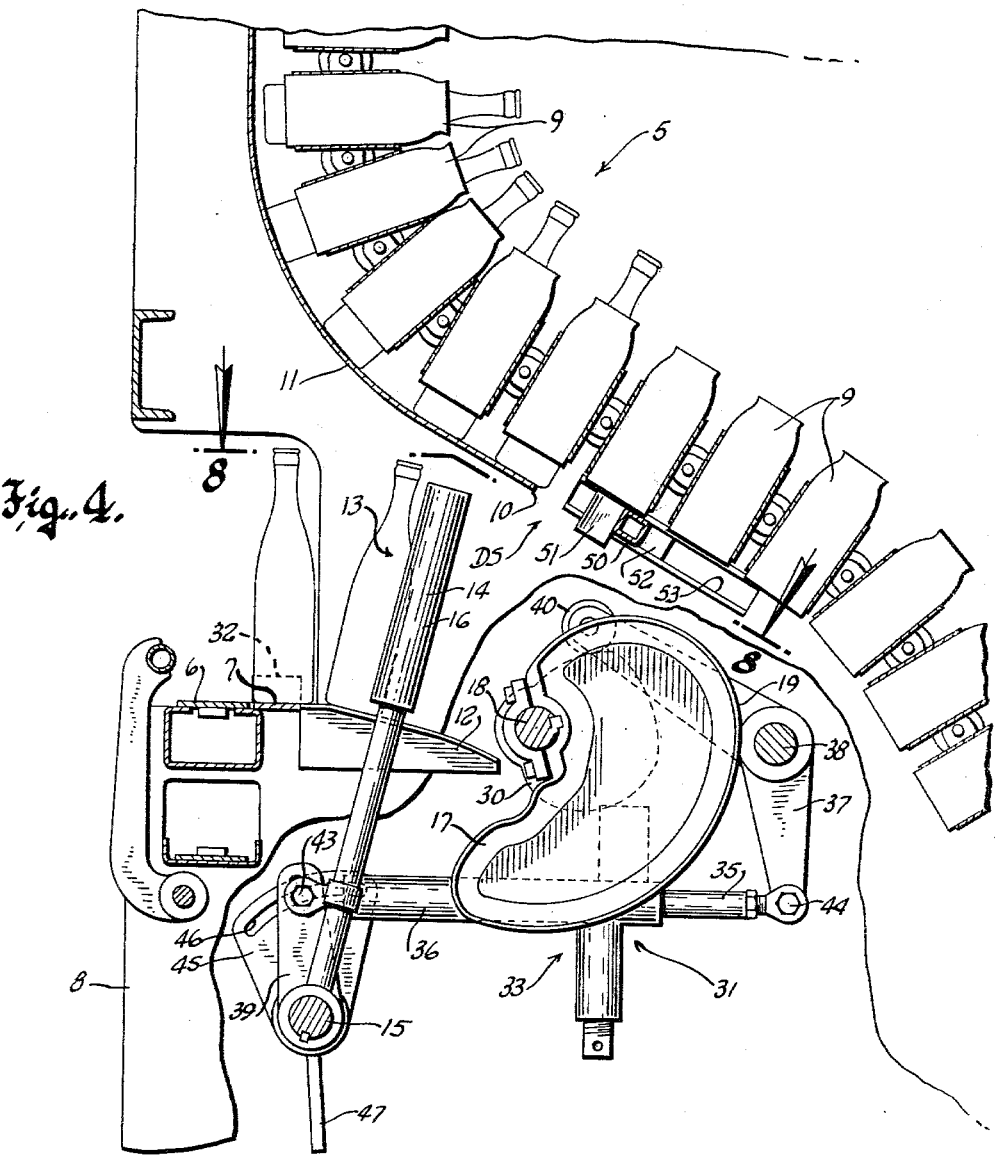
Figure 5:
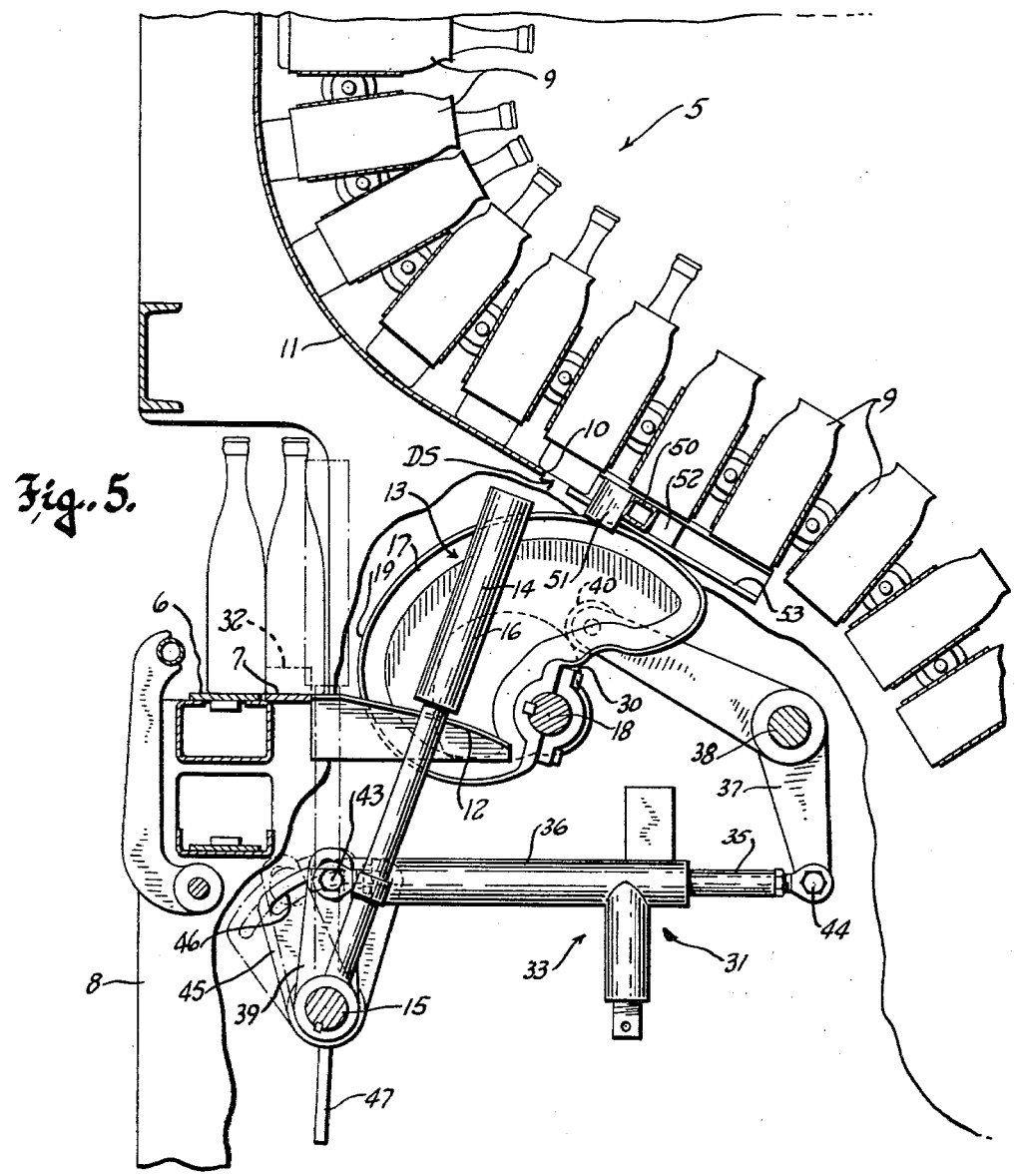
Figure 6:
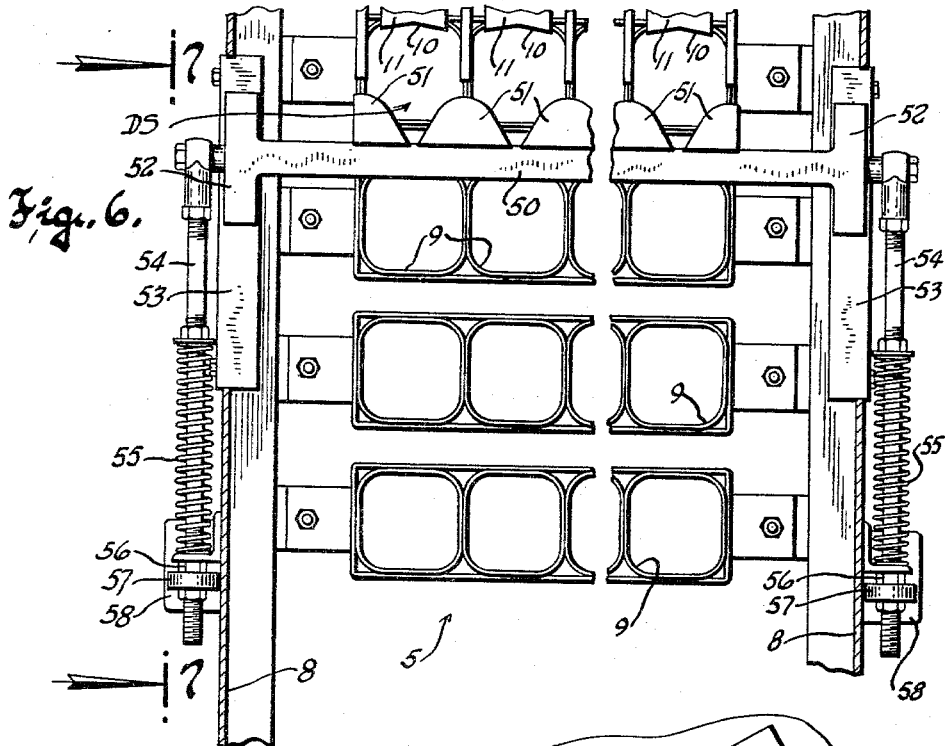
FIGURE 6 is a sectional view through FIGURE 1 on the plane of the line 6—6, to illustrate particularly a trip mechanism by which bottles that do not properly leave the conveyor pockets stop the machine.
Figure 7:
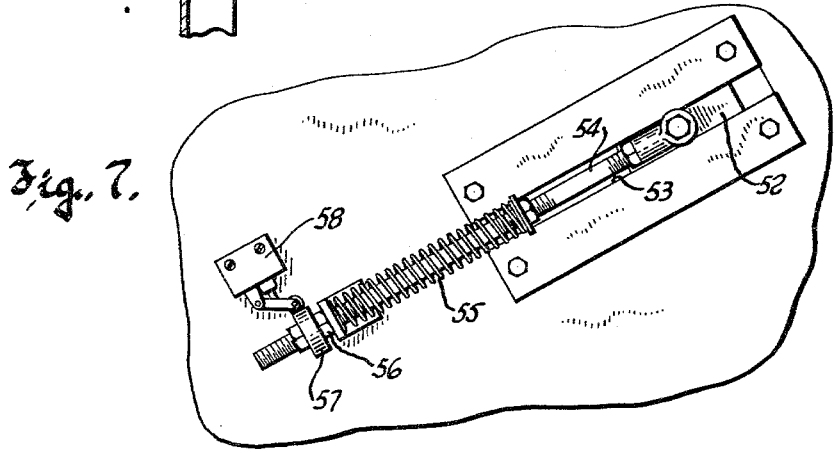
FIGURE 7 is a fragmentary detail view of part of this trip mechanism.
Figure 8:
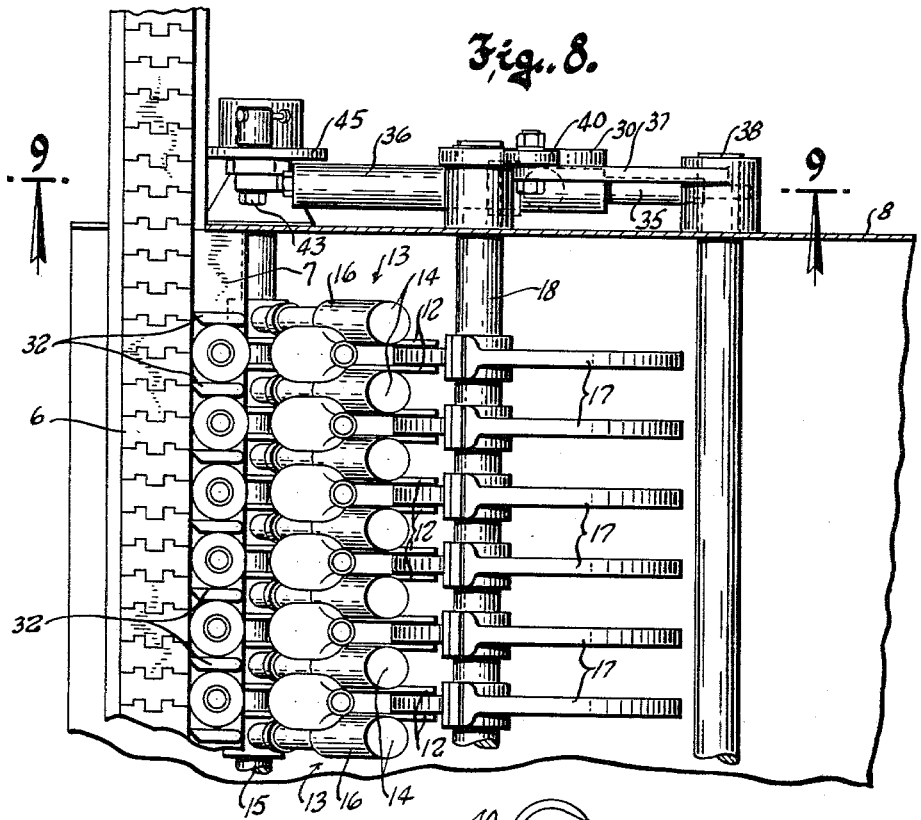
FIGURE 8 is a horizontal sectional view through FIGURE 4 on the plane of the line 8—8.

The delivery end portions of the tracks are horizontal and, hence, may be considered part of the flat, horizontal platform or dead plate 7, and because the gradient of the inclined portion of the tracks is not steep, the bottles riding up the tracks move onto their horizontal delivery end portions without tendency to wobble, but—what is more important—bottles already deilvered thereto and at rest thereon, are shoved onto the delivery conveyor 6 by the succeeding bottles with a minimum of contact between them; in fact, the contact is limited to the lower portions of the bottles, as will be readily apparent from FIGURE 4.

It is, of course, not necessary to have the bottles come to rest upon a stationary dead plate. Instead they may be pushed directly from the tracks 12 onto the delivery conveyor as they would be in the case of the inner chain 6a of the two chain conveyor shown in FIGURE 12. In this arrangement, half of each row of bottles pushed up the tracks 12 is carried away by the inner chain 6a, and the other half is removed by the outer chain 6b, the latter group of bottles being slid across the dead plate 7' by the adjacent bottles of the next succeeding row.

As noted hereinbefore, the oscillation of the guiding and pushing fingers 14 must be timed and coordinated with the rotation of the cams 17 and also with the rate of travel of the conveyor 5. Accordingly, all these devices are driven from a common source, which in the present case consists of a speed reducer 20 having an input drive pulley 21 adapted to be connected by a belt with a motor or other prime mover, not shown. By means of a sprocket 22 on the output shaft of the speed reducer, and a sprocket chain 23, the drive is carried to a jack-shaft 24 which, in turn, is drivingly connected with a pair of sprocket wheels 25 about which the conveyor 5 is trained, to be driven thereby. The sprocket wheels 25 are, of course, located at opposite sides of the machine, though only one is shown in the drawings. The connection between the shaft 24 and the sprocket wheels 25 includes an idler gear 26, a pinion 27, and a driven gear 28 fixed with respect to the sprocket wheels.

The jack shaft 24 is also drivingly connected with the shaft 18 on which the cams 17 are mounted, this drive being through a sprocket chain 29 running over sprockets fixed to the shaft 24 and to the shaft 18.

The shaft 18 not only carries the cams 17 but also mounts a motion-producing cam 30 which acts through suitable motion-transmitting linkage, indicated generally by the numeral 31, to swing or oscillate the pusher fingers 14. The cam 31 is of such shape that the pusher fingers remain stationary in their inclined bottle-receiving position until the cams 17 have lowered the bottles onto the stationary tracks; and almost interrupts their advance just before they reach the end of their delivery stroke, so that bottles being shoved up the inclined tracks are very gently pushed therefrom onto the dead plate 7 and, in so doing, also very gently push any bottle standing on the dead plate onto the conveyor 6.

To assure that bottles standing on the dead plate 7 will move only onto the delivery conveyor 6 as they are pushed by the next successive bottles, the dead plate is preferably equipped with low guard rails 32 which coact to form stalls to receive the bottles standing thereon and guide them directly onto the conveyor 6. With this arrangement it is possible to have the dead plate wide enough to hold two or more rows of bottles, thereby increasing the time for inspection, though it is doubted if this is necessary, since the transfer mechanism leaves the bottles exposed to view throughout practically their entire transfer from the conveyor 5 to the dead plate 7, where they remain stationary for a complete cycle of the machine.

Despite the fact that there is practically no likelihood that bottles will tip and become wedged during their transfer from the conveyor 5 to the delivery conveyor 6, or more particularly as they rid up the tracks 12, to guard against any possibility of injury to an operator, as for instance having a finger wedged between a guard rail 32 and a bottle ascending an adjacent track, the linkage 31 through which the cam 30 drives the bottle pushing fingers 14 incorporates a releasable load-responsive latch device, indicated generally by the numeral 33. This latch device may be of any conventional design and construction and, in the present case, comprises a detent 34 normally connecting the two sections 35 and 36 of a two-part connecting rod which forms part of the linkage 31. The detent may consist of a groove 134 in one of the rod sections and a ball 234 mounted in the other section and held in this groove by adjustable spring pressure.

The two-part connecting rod connects a lever arm 37 which is medially pivoted, as at 38, to rock about a fixed axis, and a second lever arm 39 fixed to the cross shaft 15. The lever arm 37 carries a cam follower 40, which rides upon the motion-producing cam 30. Hence, as the cam 30 rotates in unison with the cams 17, motion is imparted to the rock shaft 15 to effect the desired functioning of the combined bottle-guiding and pushing means in timed relation with the functioning of the cams 17 and the presentation of bottles to the delivery station by the conveyor 5.

In the event there is any interference with smooth delivery of the bottles by the pusher fingers 14, the additional load thereon effects release of the detent 34, thereby stopping the pushers.

Figure 9:
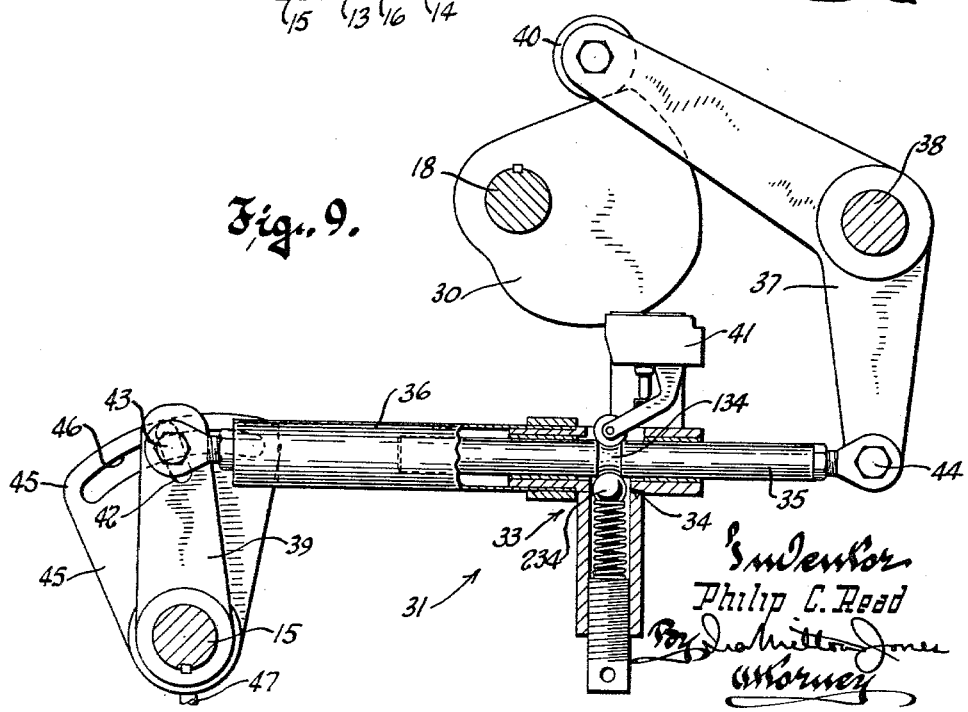
FIGURE 9 is a fragmentary detail view taken on the plane of the line 9—9 in FIGURE 8, and illustrating another safety feature which is incorporated in the drive for a portion of the unloading mechanism.

The relative motion between the two parts of the connecting rod which occurs when the detent 34 releases, also actuates a trip switch 41, see FIGURE 9. This switch is connected into the control circuit of the drive motor for the machine, to stop the same when the detent releases.

The bottle-receiving position of the bottle-guiding and pushing fingers 14 is, of course, fixed by the location of the discharge station; and while the delivery position of the pusher fingers is more or less definitely located, it has been found necessary at times to effect some adjustment thereof. This entails shortening or lengthing the arc through which the lever arm 39 is rocked, which is done by moving the point of pivotal connection between the connecting rod and the lever arm 39 farther from or closer to the axis about which the arm swings. To enable this adjustment to be made, the lever arm has a slot 42 in which a stud 43 on the adjacent end of the connecting rod is securable at any point along the length of the slot.

However, the adjustment of the length of the arc through which the lever arm swings must not disturb the bottle-receiving position of the fingers 14. Accordingly, the slot 42 follows an arc struck, as indicated in FIGURE 10, on the lever arm 39 and about the pivotal connection 44 between the other end of the connecting rod and the other lever arm 39, when the linkage is in its condition holding the pusher fingers in their bottle-receiving positions. Movement of the stud 43 in the slot thus increases or decreases the arc through which the lever arm 39 will be rocked without affecting its location at the time the pushers are in bottle-receiving positions.

To facilitate adjustment of the stud 43 in the slot, a cam plate 45 may be provided. This cam plate is mounted to turn about the axis of the lever arm 39 and overlies the latter. It has an arcuate slot 46 which is eccentric to the axis of rotation, and has the stud 43 passing through it as well as the slot 42. Thus, by simply loosening the nut holding the stud in place and turning the cam plate 45 by means of a handle 47 thereon, the stud will be moved along the slot 42.

If for some reason a bottle does not properly leave the pocket in which it was carried through the machine as that pocket arrives at the discharge station, the machine should be stopped; and while bottle unloading mechanisms of the past had provision for stopping the machine—or at least the main conveyor of the machine whenever such malfunctioning occurred—the present invention incorporates this feature in an improved and simplified manner. Thus, there is a trip bar 50 extending across the machine beneath the path of the pockets 9 of the main conveyor 5, and spaced from the edge 10 of the retainer a distance to allow the bottles to drop as they reach the discharge station. Preferably, this trip bar has pads 51 thereon facing the edge 10, and spaced to align with the pusher fingers 14 when the latter are in their bottle-receiving, chute-forming positions.

The ends of the bar have cross heads 52 slidably received in slideways 53 in the side walls 8, whereby the trip bar is mounted for limited movement parallel to the path of the adjacent portion of the conveyor 5. Each cross head 52 has a push rod 54 connected thereto, the push rods being slidably mounted on the side walls 8 and having coil springs 55 thereon to yieldingly urge the trip bar towards the edge 10 and normally hold the same in a position determined by the adjustment of stop nuts 56 on the push rods.

Since the push rods are at the outer side of the walls 8, the adjustment of the stop nuts and hence the normal position of the trip bar, may be easily effected.

The push rods also have abutments 57 adjustably mounted thereon to coact with trip switches 58 fixed to the side walls 8, the trip switches being operative to stop the motor (not shown) which drives the speed reducer 20. Since actuation of either trip switch will stop the motor, the trip bar need not move with a translating motion to effect its purpose, rocking thereof about one of its ends will suffice. Thus it makes no difference where along the length of a row of conveyor pockets the bottle fails to leave its pocket. Any bottle that does not do so will become wedged between the advancing conveyor and the trip bar, and as a result the bar will be moved to actuate one or the other, or perhaps both, of the trip switches.

By having the trip bar entirely independent of the transfer mechanism, and by having it mounted as it is, the needed adjustments can be made more easily and a generally more reliable device is achieved.

One of the primary features of this invention resides in the fact that the transfer of the bottles from the pockets of the conveyor by which they are carried through the machine to the delivery conveyor, is effected conjointly by the rotating cams 17 and the bottle guiding and pushing means 13. As pointed out hereinbefore, this manner of handling the bottles during the transfer provides better stability and greater assurance against stoppage than was possible heretofore. The attainment of this objective can be further assured by having the motion of the bottle guiding and pushing means effected in the manner shown in FIGURE 13. In this modified construction, the fingers 14 are mounted on a carriage 60 which extends across the machine and has a pair of rollers 61 at each end riding in tracks 62. These tracks are so shaped that the fingers remain substantially perpendicular to the tracks 12 throughout their bottle pushing motion. Accordingly, the positional relationship between the fingers 14 and the bottles does not change as the bottles are pushed up the inclined tracks towards and onto the delivery conveyor or the dead plate leading thereto.

Any suitable means may be provided for moving the carriage 60 back and forth along the tracks 62. For instance, this may be done by a rock shaft 63 having rocker arms 64 fixed to its opposite ends and connected to the carriage, as at 65, through connecting rods 66; and linkage 67 to connect the rock shaft with a cam similar to the cam 30. Though not shown in FIGURE 13, the connecting rods 66 may have releasable load responsive latch devices incorporated therein such as the latch device 33 shown in FIGURE 9.

Figure 14:
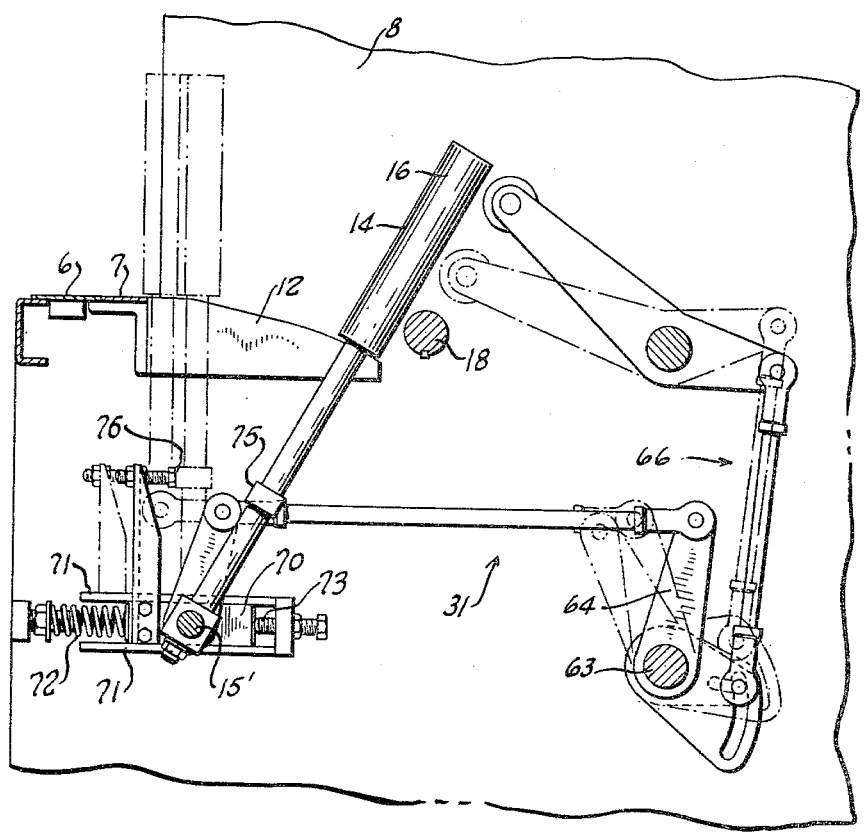
FIGURE 14 is a view similar to FIGURE 13, but illustrating still another alternative way of guiding the motion of the bottle guiding and pushing means.

Another way of effecting translatory motion of the fingers 14 at the ends of their bottle-delivering stroke is illustrated in FIGURE 14. In this modified embodiment of the bottle-delivering mechanism, the fingers 14 are again mounted on a rock shaft 15′, but this shaft not only rocks to swing the fingers from an inclined bottle-receiving position to an upright bottle-delivering position, but also has horizontal translatory motion imparted thereto after the fingers 14 assume their upright positions.

Accordingly, the rock shaft 15′ is journalled in slides 70 (one at each side of the machine) which ride between fixed horizontal tracks 71. Springs 72 reacting between fixed abutments suitably mounted on a stationary part of the machine and one end of the slides yieldingly hold the slides, and hence the rock shaft in a normal or retracted position which corresponds to the position the rock shaft occupies in the first described embodiment of the invention. This normal position is defined by adjustable stops 73 with which the adjacent ends of the slides 70 engage.

The springs 72 are strong enough to hold the slides against the stops 73 during the interval the rock shaft 15′ is rocked by the cam driven linkage 74 which is similar to the linkage 31, to swing the fingers 14 from their inclined bottle-receiving positions to their vertical bottle-delivering positions. At the instant the fingers 14 reach their vertical position, abutments 75 on at least the endmost fingers collide with stops 76 which are fixed with respect to the slides 70, but the cam produced motion of the linkage 74 continues. Since the stops 76 prevent further rotation of the rock shaft, the slides 70 and in fact the entire bottle-guiding and pushing means, now moves forward with a horizontal translating motion until the end of the delivery stroke.

Obviously, during retraction, the springs 72 first move the slides back to their normal positions engaging the stops 73 and then the fingers 14 swing back to their inclined bottle-receiving positions.

From the foregoing description, taken in connection with the accompanying drawings, it will be apparent to those skilled in this art that this invention provides a greatly simplified and improved bottle-unloading device for bottle-washers and the like.

What is known as my invention is:

1. In a bottle handling machine having means to successively present bottles to a discharge station, mechanism for removing bottles from the machine as they are brought to and leave the discharge station, comprising:
   (A) a stationary track below the discharge station and along which bottles standing erect thereon may be moved;
   (B) movable bottle guiding and pushing means extending up from the track and movable back and forth between an inclined bottle-receiving position forming a chute leading from the discharge station to the track and down which bottles may slide onto the track, and an upright bottle-delivering position adjacent to the delivery end of the track, to push bottles along the track to its delivery end,
       said bottle guiding and pushing means extending from a point closely adjacent to the discharge station to a point contiguous to the track when said means is in its inclined bottle-receiving position, so that the chute formed thereby leads uninterruptedly from the discharge station to the track and bottles on the track are firmly supported against tipping or wobbling as they are pushed therealong by the guiding and pushing means;
   (C) cam means rotatable about a horizontal axis and operable in the zone between the discharge station and the track to support and gently lower bottles in said chute onto the track as the cam means rotates;
   (D) drive means operatively connected with the cam means and with the bottle guiding and pushing means to continuously rotate the cam means and impart back and forth motion to the guiding and pushing means in timed relation with the rotation of the cam means,
       said drive means including a rotatable motion-producing cam, a cam follower and motion-transmitting linkage connecting the cam follower with the guiding and pushing means; and
   (E) means providing an adjustable connection in said motion-transmitting linkage by which the delivery position of the bottle guiding and pushing means may be adjusted without affecting its bottle-receiving position,
       said last named means comprising a first lever arm fixed with respect to the cam follower and constrained to swing about a fixed axis, a second lever arm fixed with respect to the bottle guiding and pushing means constrained to swing about a fixed axis, a link having one end thereof pivoted to the first lever arm, and adjustable means to pivotally connect the other end of the link to the second lever arm at different selected distances from the axis about which said second lever arm swings.

2. The structure of claim 1, further characterized by means to constrain the adjustment of the point of connection between the link and said second lever arm to an arc struck on the second lever arm about the pivotal connection of the link with the first lever arm when the linkage is in the position it occupies at the time the bottle guiding and pushing means is in its bottle-receiving position.

3. The structure of claim 2, wherein
   (A) the means to pivotally connect the link with the second lever arm comprises a stud adjustably fixed to the lever arm; and wherein
   (B) the means to constrain the adjustment of the point of connection between the link and the second lever arm comprises a slot in said lever extending along said arm and in which the stud is received.

4. In a bottle handling machine having means to successively present bottles to a discharge station, mechanism for removing bottles from the machine as they are brought to and leave the discharge station, comprising:
   (A) a stationary track below the discharge station and along which bottles standing erect thereon may be moved;
   (B) movable bottle guiding and pushing means extending up from the track and movable back and forth between an inclined bottle-receiving position forming a chute leading from the discharge station to the track and down which bottles may slide onto the track, and an upright bottle-receiving position adjacent to the delivery end of the track to push the bottles along the track to its delivery end,
       said bottle guiding and pushing means comprising
           (1) a carriage, and
           (2) a pair of fingers fixed to the carriage and embracing the track;
   (C) guide track means for the carriage;
   (D) roller means on the carriage riding on said guide track means, said guide track means being substantially parallel to the bottle-supporting track so that the positional relationship between the pair of fingers and a bottle engaged thereby does not change as the bottle is slid along the track;

(E) cam means rotatable about a horizontal axis and operable in the zone between the discharge station and the track to support and gently lower bottles in said chute onto the track as the cam means rotates; and (F) drive means operatively connected with the cam means and the bottle guiding and pushing means to continuously rotate the cam means and impart back and forth motion to the guiding and pushing means in timed relation with the rotation of the cam means.

5. In a bottle handling machine having means to successively present bottles to a discharge station, mechanism for removing bottles from the machine as they are brought to and leave the discharge station, comprising:

(A) a stationary track below the discharge station and along which bottles standing erect thereon may be moved;

(B) a horizontal rock shaft below the track;

(C) a pair of parallel fingers fixed to the rock shaft and extending upwardly therefrom and embracing the track;

(D) means mounting the rock shaft for translatory motion in a substantially horizontal plane between a normal position in which it is free to oscillate and an advanced position;

(E) means yieldingly holding the rock shaft in its normal position and resisting movement thereof toward its advanced position;

(F) motion transmitting means connected with the rock shaft to impart oscillation thereto, to thereby swing the fingers from an inclined bottle-receiving position adjacent to the discharge station and forming a chute leading from the discharge station to the track, to an upright bottle-delivering position adjacent to the delivery end of the track, to push bottles along the track to its delivery end;

(G) means to arrest oscillation of the rock shaft when the fingers reach their upright position without interfering with translatory motion of the rock shaft toward its advanced position;

(H) means to effect translatory motion of the rock shaft toward its advanced position in opposition to said yieldable holding means after oscillation of the rock shaft is arrested, whereby said fingers move with a translatory motion during final delivery of the bottles;

(I) cam means rotatable about a horizontal axis and operable in the zone between the discharge station and the track to support and gently lower bottles in said chute onto the track as the cam means rotates; and (J) drive means operatively connected with the cam means and with said motion transmitting means and the means to effect translatory motion of the rock shaft, to continuously rotate the cam means, oscillate the rock shaft and effect back and forth translatory motion of the rock shaft.

6. The structure of claim 5, wherein the portion of said drive means which imparts oscillation to the rock shaft produces motion in excess of that needed to swing the fingers to their upright position and said excess motion imparts translatory motion to the rock shaft.

7. In a bottle-washing machine having means to successively present bottles to a discharge station, mechanism for removing bottles from the machine as they are brought to and leave the discharge station, comprising:

(A) a stationary track below the discharge station and along which bottlees standing erect thereon may be moved;

(B) movable bottle-guiding and pushing means extending up from the track and movable back and forth between an inclined bottle-receiving position at the discharge station, forming a chute leading from the discharge station to the track and down which bottles may slide onto the track and an upright bottle-delivering position adjacent to the delivery end of the track to push the bottles along the track to its delivery end, said bottle guiding and pushing means extending from a point closely adjacent to the discharge station to a point contiguous to the track when said means is in its inclined bottle-receiving position so that the chute formed thereby leads uninterruptedly from the discharge station to the track and bottles on the track are firmly supported against tipping or wobbling as they are pushed therealong by the guiding and pushing means, (C) cam meeans rotatable about a horizontal axis and operable in the zone between the discharge station and the track to support and gently lower bottles in said chute onto the track as the cam means rotates;

(D) drive means operatively connected with the cam means and with the bottle guiding and pushing means to continuously rotate the cam means and impart back and forth motion to the guiding and pushing means in timed relation with the rotation of the cam means; and (E) instrumentalities to stop the machine when a bottle does not properly leave the discharge station comprising a trip bar directly at the discharge station and normally occupying a position directly above the upper extremity of the bottle guiding and pushing means when the latter is in its inclined bottle receiving position.

8. In a bottle handling machine, the combination of:

(A) fixed bottle supporting means having a drop-off edge, the location of which defines a discharge station for the machine;

(B) power driven conveyor means to positively advance bottles resting on the supporting means towards its drop-off edge and to successively above them off said edge;

(C) trip bar means operatively connected with the power driven conveyor means to stop the same when the trip bar means is moved out of its normal position;

(D) means mounting and yieldingly maintaining the trip bar means in its normal position directly opposite said drop-off edge in the path of bottles being advanced by the conveyor means but spaced from said edge a distance to accommodate the bottles which leave the conveyor means properly, whereby bottles that do not leave the conveyor means properly but are carried past the drop-off edge, move the trip bar means;

(E) means providing a stationary track below the drop-off edge of the bottle supporting means and spaced therefrom a distance greater than the height of the bottles handled by the machine, so that bottles may stand erect on said track and be moved therealong;

(F) movable bottle guiding and pushing means extending up from the track and movable back and forth between (1) an inclined bottle receiving position forming a chute having its receiving end directly below the trip bar means to receive bottles as they are shoved off said drop-off edge and having its delivery end of the track so that bottles shoved off the drop-off edge may slide down said chute to the track, and (2) an upright bottle-delivering position adjacent to the delivery end of the track, to push bottles along the track to its delivery end and at the same time supportingly engage said bottles for their full height;

(G) rotatable cam means mounted to turn about a horizontal axis and operable in the zone between the drop-off edge and the track to support and gently lower bottles in said chute onto the track; and (H) drive means operatively connected with the cam means and with the bottle guiding and pushing means to continuously rotate the cam means and impart back and forth motion to the bottle guiding and pushing means in timed relation with rotation of the cams.

9. In a bottle-handling machine having a power driven endless conveyor provided with pockets to receive and carry bottles through the machine and to bring them to a discharge station, and transfer mechanism to recive bottles from the pockets of the conveyor as they arrive at the discharge station and remove them from the machine; means to stop the conveyor in the event a bottle fails to properly leave a conveyor pocket at the discharge station, comprising:

(A) a trip member distinct from the transfer mechanism;

(B) means mounting the trip member between the path of the conveyor pockets and the transfer mechanism for limited movement with respect to the transfer mechanism and parallel to the adjacent portion of the conveyor path;

(C) means yieldingly holding the trip member in a position from which it is movable with respect to the transfer mechanism in the direction the conveyor travels, and in which it is engageable by bottles which do not properly leave the pockets of the conveyor and instead are carried thereby past the discharge station, so that such bottles move the trip member before they reach the transfer mechanism; and (D) switch means responsive to such motion of the trip member and operable to effect stopping of the conveyor.

10. In a bottle-handling machine having spaced side walls, a power driven endless conveyor having rows of pockets extending transversely across the machine between its side walls, to receive and carry bottles through the machine and to bring them to a discharge station, transfer mechanism to receive bottles from the pockets of the conveyor as the rows of pockets successively arrive at the discharge station and remove them from the machine; means to stop the conveyor in the event a bottle fails to properly leave a pocket at the discharge station, comprising:

(A) a trip bar extending transversely across the machine from side wall to side wall;

(B) means on the side walls mounting the trip bar between the transfer mechanism and the adjacent portion of the conveyor for limited motion with respect to the transfer mechanism and parallel to the adjacent portion of the conveyor path, said means allowing swinging motion of the trip bar about either of its ends as well as translatory motion thereof;

(C) means yieldingly holding the trip bar in a position from which it is movable with respect to the transfer mechanism in the direction the adjacent portion of the conveyor travels and in which position the trip bar is engageable by any bottle which does not properly leave its pocket at the discharge station but instead is carried thereby past the discharge station so that such bottles move the trip bar before they reach the transfer mechanism; and (D) switch means on each side wall operatively associated with the adjacent end of the trip bar to be actuated by motion thereof in consequence of a bottle being carried along by the conveyor beyond the discharge station, each of said switch means being operative to effect stopping of the conveyor.

References Cited by the Examiner

UNITED STATES PATENTS

| | | | |
|---|---|---|---|
| 1,506,632 | 8/24 | Gruetter | 198—24 X |
| 1,787,993 | 1/31 | Meyer. | |
| 1,810,958 | 5/33 | Meyer et al. | |
| 2,858,929 | 11/58 | Vamvakas | 198—25 |

SAMUEL F. COLEMAN, *Primary Examiner.*

ERNEST A. FALLER, JR., WILLIAM B. LA BORDE, *Examiners.*